(12) United States Patent
Feierabend

(10) Patent No.: US 7,699,193 B2
(45) Date of Patent: Apr. 20, 2010

(54) SELF-CLOSING VALVE

(75) Inventor: Jens Feierabend, Weener (DE)

(73) Assignee: Weener Plastik GmbH & Co., KG (DE)

( * ) Notice: Subject to any disclaimer, the term of this patent is extended or adjusted under 35 U.S.C. 154(b) by 870 days.

(21) Appl. No.: 10/808,667

(22) Filed: Mar. 25, 2004

(65) Prior Publication Data
US 2004/0178230 A1    Sep. 16, 2004

Related U.S. Application Data

(63) Continuation-in-part of application No. 10/048,445, filed on Jul. 1, 2002, now Pat. No. 6,769,577.

(30) Foreign Application Priority Data

Jul. 29, 1999  (DE) .......................... 299 13 319 U
Aug. 9, 1999   (DE) .............................. 199 37 549

(51) Int. Cl.
  *B65D 5/72*     (2006.01)
  *F16L 29/00*    (2006.01)
(52) U.S. Cl. ..................... 222/494; 222/490; 251/149.1

(58) Field of Classification Search ......... 222/490–497; 251/149.1
See application file for complete search history.

(56) References Cited

U.S. PATENT DOCUMENTS

| | | | |
|---|---|---|---|
| 3,273,754 A | 9/1966 | Lindley | |
| 4,133,457 A | 1/1979 | Klassen | |
| 6,089,411 A * | 7/2000 | Baudin et al. | ............... 222/212 |
| 6,095,381 A | 8/2000 | Schwanenberg | |
| 6,457,613 B1 | 10/2002 | Patterson | |

FOREIGN PATENT DOCUMENTS

GB    9912977.7    *  6/1999

* cited by examiner

*Primary Examiner*—Kevin P Shaver
*Assistant Examiner*—Melvin A Cartagena

(57) ABSTRACT

The invention relates to a self-closing valve for the dispensing of flowable media from a container comprising a curved membrane, a support segment, a connecting wall as well as a slitting provided in said membrane.

17 Claims, 6 Drawing Sheets

Figure 6:
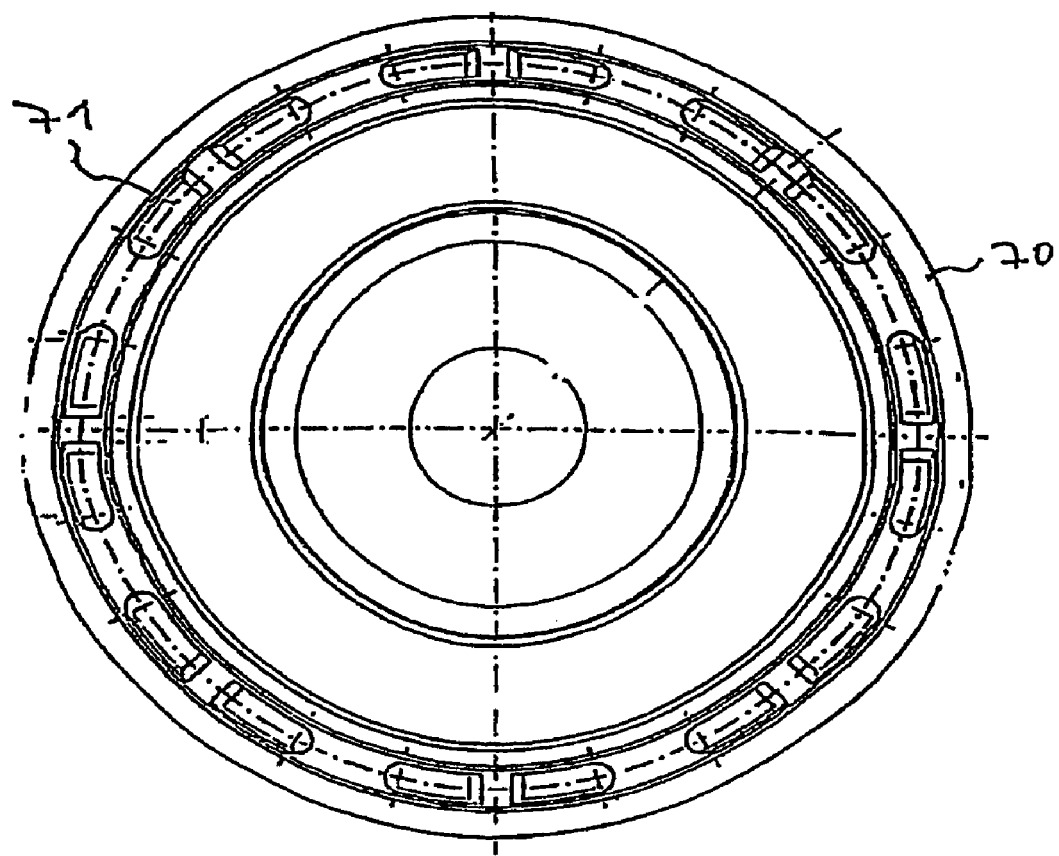

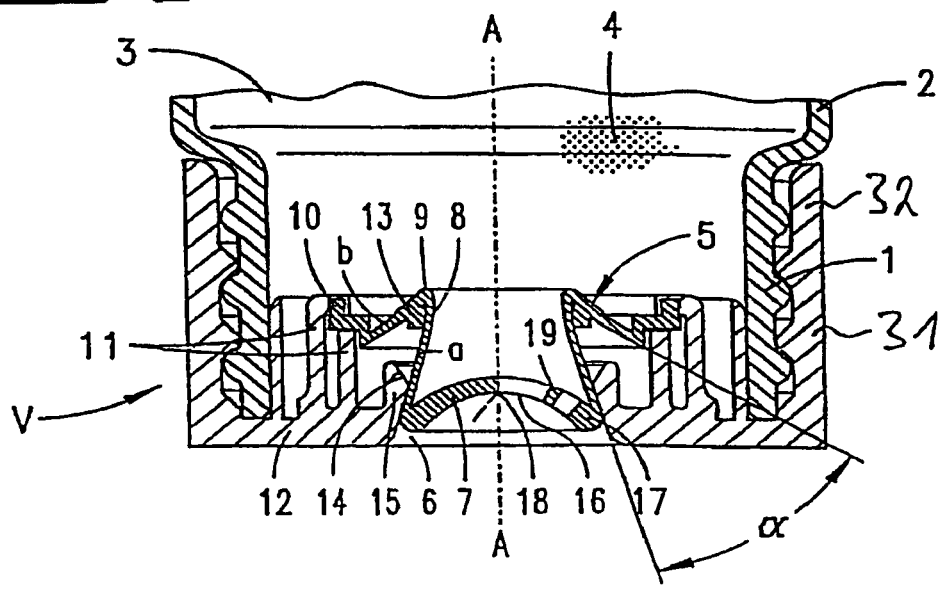
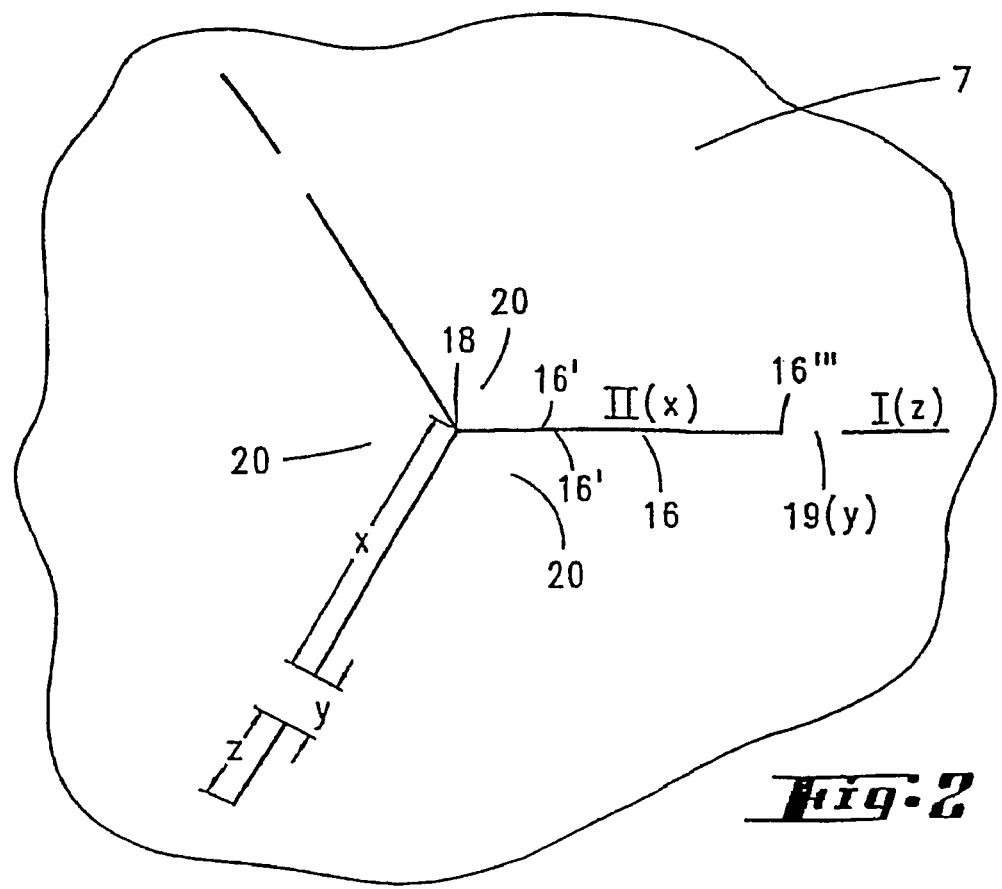

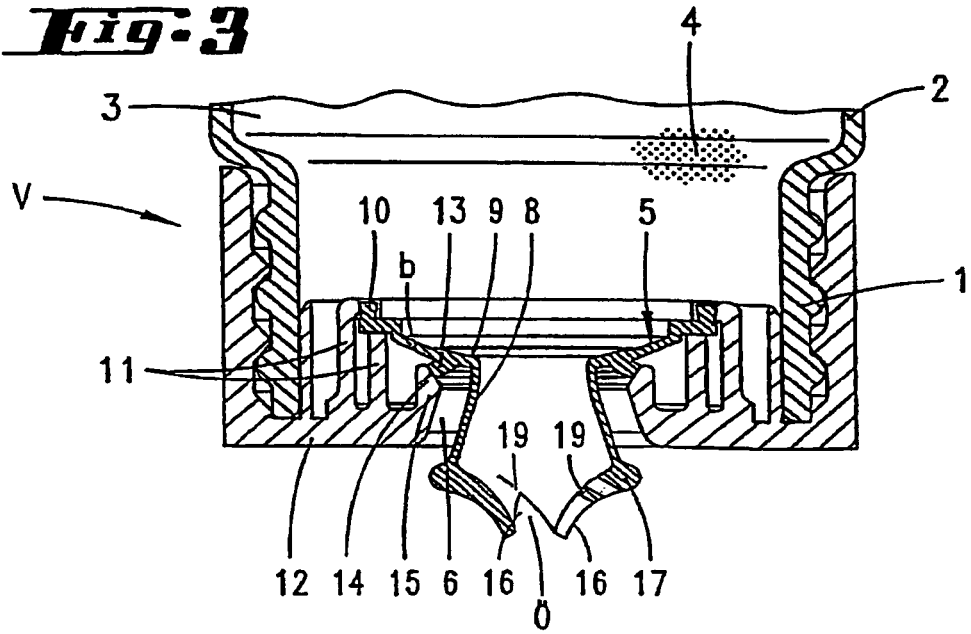
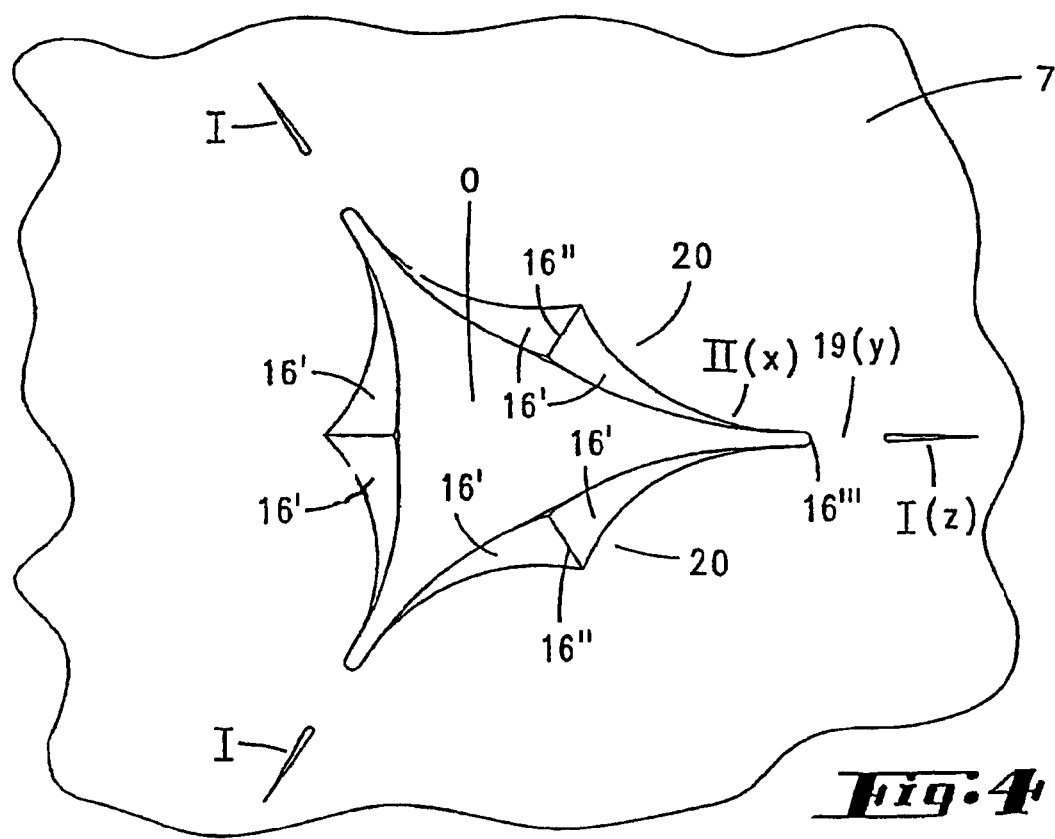

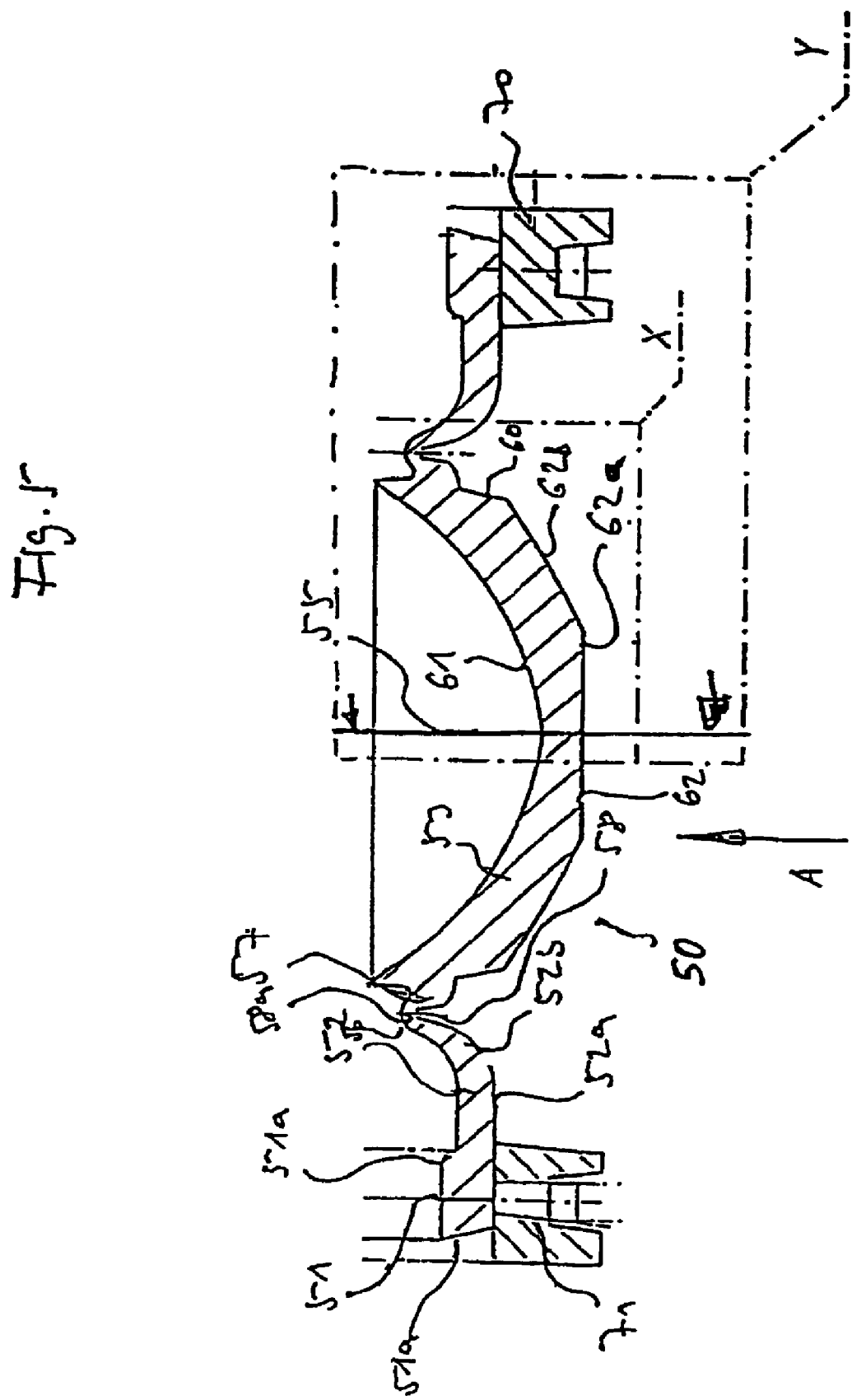

ANSICHT A

SELF-CLOSING VALVE

CROSS REFERENCE TO RELATED APPLICATION

This application is a continuation of application Ser. No. 10/048,445, filed Jul. 1, 2002, which is the National Stage of International Application No. PCT/EP00/07388, filed Jul. 31, 2000, which claims benefit of prior German Application No. 29913 319.2, filed Jul. 29, 1999 and German Application No. 19937 549.6, filed Aug. 9, 1999.

The present invention relates to a self-closing valve for the dispensing of flowable media from a container.

There are a number of liquid and fluidized products which are sold to consumers in such containers.

These fluids include, for example, cleansing and personal care products for the human body such as liquid soaps, shower gels, shampoos, skin oils, etc. Another group of such products are foods and condiments such as ketchup, mustard, honey and the like. A third group of these products are utilitarian fluids such as, for example, oils used for technical purposes, etc.

What all these cited products have in common is that the consumer dispenses them from their containers in relatively small quantities.

Conventional containers have a closure cap screwed onto the container neck for this purpose. To dispense the liquid, the container is tilted and the liquid discharged. Depending on the viscosity of the liquid and its intended use, there are a number of different designs, for example small end openings in flexible containers which are squeezed inward to dispense the liquid.

There are numerous proposals within the patent literature for configuring such a container closure having a self-closing valve. This type of valve has the advantage that the user doesn't have to remove the closure cap each time liquid is to be dispensed.

Yet the demands placed on a self-closing closure are very high. The closure must operate simply because otherwise there would be no advantage over conventional screw closures, and on the other hand it has to exhibit an adequate seal for its respective intended use.

A container closure having a self-closing valve is proposed in EPA 0 545 678 in which a curved membrane is employed which is connected to a retaining lip by means of a connecting wall. The connecting wall is arranged between the membrane and the retaining lip such that it extends in a rolling motion to open the membrane, exerting an opening force on said membrane and inducing it to open.

Starting from this prior art, the present invention puts forth the task of providing a self-closing valve with good opening and sealing qualities which is of small dimensions, which can be inserted into a simply-designed closure cap, and which is easy and economical to produce.

This task is inventively solved by the object of claim 1.

Further embodiments of the present invention comprise the subject matter of the subclaims.

The inventive solution provides for a self-closing valve which, on one hand, opens reliably when pressure is applied to the container in the dispensing position and yet which, on the other hand, closes in a reliable and sealed fashion.

The valve according to the present invention comprises an annular connecting wall which is arranged substantially perpendicular to the longitudinal axis of the container closure or, in other words, which is substantially parallel to the plane in which the closure membrane extends. The membrane is hereby acceded movability by means of a hinge-like design between the dividing wall and the membrane side wall, yielding what comes close to a flexibly slack suspension of the membrane, and thus preventing the transferring of torque from the dividing wall to the membrane and vice-versa.

The present invention provides for a curved membrane, its curve being directed toward the container interior in the closed position. When the container is squeezed while inverted, meaning when the valve is underneath, an excess pressure is created in the container and the membrane bulges outwardly, whereby slits in the membranes then open, allowing the passage of the fluid.

The membrane and the slits are mated to one another such that upon the membrane's outward deformation, elastic resilient forces build up in the membrane which, upon depressurization, induce the valve to close.

The membrane and the connecting wall are preferably designed to be rotationally symmetric. In such an embodiment, the support segment is likewise preferably configured to be rotationally symmetric.

The membrane is preferably configured such that it has an approximate semi-spherical shape in the static position. However, the term "semi-spherical" is meant here solely as an indication of the general fundamental design and is not to be considered as an exact geometric definition of the membrane's form.

The membrane is provided with slits so that it can open.

Particularly in the case of a rotationally symmetric membrane, four or five slits can be provided which in each case extend outwardly from the axis of rotation; i.e. toward the connecting wall.

According to a preferred embodiment of the present invention, one slit is provided which will then extend radially across the axis of rotation.

It is however especially preferred for the membrane to be provided with three slits. In a rotationally symmetric design to the membrane, these slits are arranged such that they extend radially outwardly from the axis of rotation. The slits are preferably disposed at the same angular distance from one another, which amounts to an angle of 120°.

The use of three slits has particular advantages.

A slitted design having three, four or five slits divides the membrane into a corresponding number of pointed flaps. After deformation and opening, these flaps must be returned to their original position again so that their sectional edges will precisely position against one another. A slight offsetting of the flaps will lead to said flaps, particularly in the area of their tips, riding up over one another, preventing said flaps from having a fully sealed contact.

This kind of problem cannot arise in the case of just one centric slit since the type of flaps as described above are not formed.

The particularly preferred structuring having three slits is based on the knowledge that such flaps, when provided at angles of 120°, offer far greater protection against lateral displacements and offsettings than flaps provided at just 90° or less.

In accordance with another, especially preferred embodiment of the present invention which is as suited for one, but also preferably for three, four, five or more slits, a slit design incorporates at least one material bridge within said slit.

Said material bridge(s) functions like an elastic draw spring within the elastic membrane, pulling the slits back together upon reclosing.

As will be explained in more detail subsequently, such a design provides for a closure which has a strong closing force despite having a low opening force and which induces a reliable guiding of the closure flaps so that their respective side faces will position against one another.

The connecting wall may be configured as a thicker wall, resulting in a very stable supporting of the membrane relative a closure cap. It is, however, also possible to configure the connecting wall in a thinner fashion.

In the case of a thick-walled and thus rigid connecting wall, it is particularly preferred that the membrane and the connecting wall are decoupled as regards torque; i.e. that membrane movement is affected as little as possible by the forces and especially by the torque which could be transmitted from the connecting wall to the membrane.

This condition is yielded by a hinge-like connection between the connecting wall and the membrane. Such a hinge can be produced in various different ways. Especially preferred is a thin segment arranged in the area of connection between the connecting wall and the membrane and which rotates about the membrane when same is of rotationally symmetric design. In order to enhance the hinge effect, said thin segment is preferably of S-shape in cross-section.

As described above, the contact surface between connecting wall and membrane is preferably configured in such a manner that especially no torque will be transmitted from the connecting wall to the membrane. In accordance with a preferential design, this contact surface can also be realized with the use of inhomogeneous material in this area, meaning, for example, that another material is used in this area or that the properties of the material are appropriately controlled so as to attain the desired diminishing of the ability to transfer torque.

The valve according to the present invention may be manufactured from any material which exhibits the appropriate properties for the elastic deformation and the elastic resilient strength.

It is particularly preferable to manufacture the membrane and/or the connecting wall from a silicone material. It is furthermore possible to manufacture the membrane and/or the connecting wall from a thermoplastic elastomer. When so doing, the connecting wall, the support segment and the membrane are all preferably of the same material and form a valve body.

Especially preferred is the reinforcing of the self-closing valve's support segment with synthetic means, a plastic ring in the case of a rotationally symmetric design to the valve, which in contrast to the material of the connecting wall and the membrane, is made from a rigid and, where applicable, also more economical synthetic material.

In accordance with a preferred embodiment, a reinforcing ring made of a harder plastic is molded onto the support segment. When so doing, it is preferable that the plastic ring is manufactured in a separate prior manufacturing step from that of the self-closing valve and that a plurality of openings are provided on said reinforcing ring into which the valve material can penetrate during the molding process so that a deep, lasting and moreover reasonably-priced connect-ion is created between the reinforcing ring and the valve body.

It is preferred to use polyamide as the material for the reinforcing ring.

The injection molding process may be especially preferably designed such that the polyamide ring and the silicone membrane are molded directly subsequent one another and in particular in a manner in which the polyamide is first injected into the injecting tool, the injecting tool is then subsequently opened and brought to another cavity arrangement with the silicone then being injected into this other cavity. When an injection is made simultaneously to a second or, as preferred, to several valves, the polyamide material for the producing of the ring is then in turn injected into a number of second cavities.

Thus a first sequence phase ensues in which only polyamide rings are injected and then the polyamide rings are respectively molded in a phase of simultaneous injection of silicone to said previously-molded polyamide rings so as to then result in one, respectively the total number of valves being molded in one respective sequence phase.

It must be noted that such an approach is not limited to polyamide and silicone materials but rather can also be realized with other materials, thermoplastic elastomers, etc.

The terms "fluid," "liquids" and "medium" or "flowable medium" as used in the present description are to be understood as all substances having a viscosity which allows for their being discharged from a container, if necessary by means of an additional exertion of pressure, regardless of whether said viscosity is dynamic or kinematic. Hence these terms include not only such substances which flow on their own such as, for example, watery substances, but also substances which may only flow when pressure is applied to them such as, for example, greasy or pasty substances.

In accordance with a first preferential use, the closure is used for food products and those food products of the group comprising the following foods: vegetable and fruit juices and other drinks, seasoning sauces of all types such as soy sauce and the like, viscous seasonings such as mustard, ketchup, mayonnaise and viscous foods such as honey, jellies, jams, and milk products like milk, condensed milk, cream, etc.

It is furthermore preferred to employ the valve in the packaging of personal care and cleansing products such as liquid or pasty soap, shower gels, skin oils, sun tanning or blocking preparations, shampoos, hair colorants, skin creams, deodorants, etc.

Use of the valve is additionally preferred with other cleaning and care products such as dishwashing liquids, universal cleaning agents, shoe creams, polishes, stain removers, liquid detergents and the like.

Use of the closure is also preferred for pharmaceutical products and preferably for products which are consumed in small quantities such as, for example, eye drops, nose drops, disinfectants, and all types of pharmaceutical products regardless of whether they are for internal or external usage.

A further preferential use is that with technical products such as, for example, paints, varnishes, solvents, lubricants and other technical chemical and substance mixtures.

Figure 7:
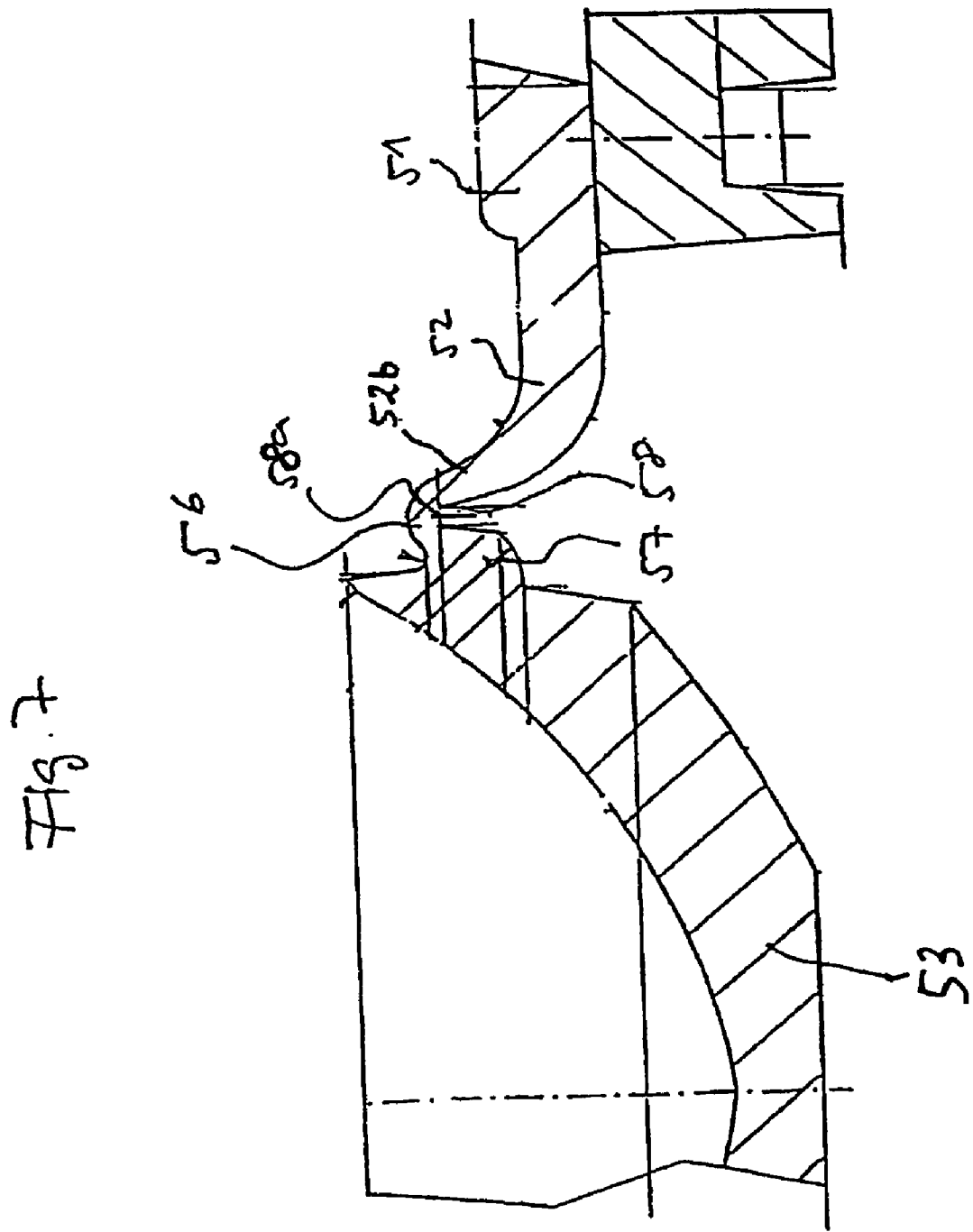
Figure 8:
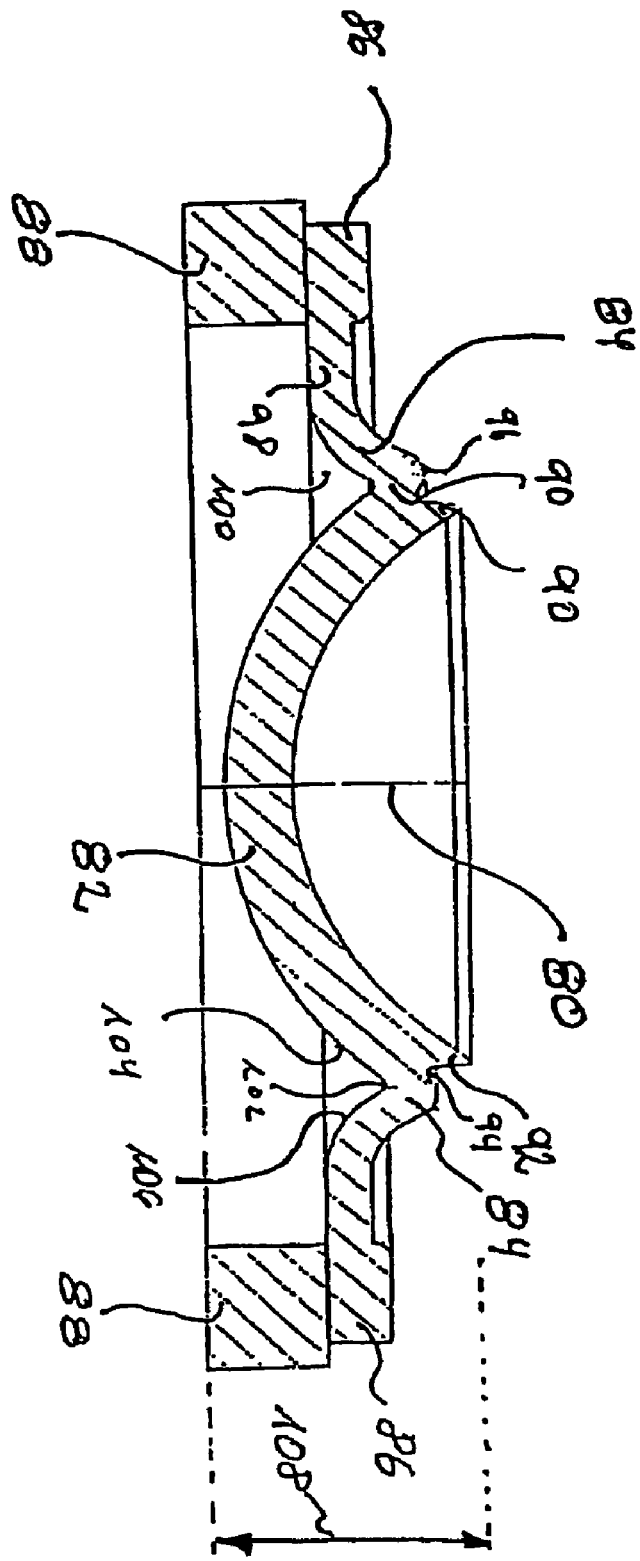

Further advantages, features and conceivable applications of the present invention will ensue from the description of embodiments in connection with the drawings, which show:

FIG. 1 a cross-sectional view through the closure of an inverted container in which a first embodiment of a self-closing valve according to the prior art is disposed in the closure;

FIG. 2 a bottom plan view of the embodiment according to FIG. 1;

FIG. 3 the embodiment according to FIG. 1 in opened state;

FIG. 4 a top plan view of the depiction according to FIG. 3;

FIG. 5 a sectional representation of an embodiment of the inventive valve;

FIG. 6 a bottom plan view of the embodiment according to FIG. 5 as seen looking toward the retaining ring;

FIG. 7 a detail view of the embodiment according to FIG. 5 in sectional representation;

FIG. 8 an embodiment of the inventive valve in sectional representation.

The whole of the closure depicted in FIG. 1 is indicated by V. The closure is screwed onto the neck 1 of a container 2 having a conventional thread. In the interior of the container, indicated by reference number 3, the fluid or medium is indicated symbolically by reference number 4, its viscosity having been selected so as to allow its discharging from a closure of the type depicted here. The container wall consists completely or partly of flexible material which the user can squeeze inwardly.

Neck 1 of container 2 is configured to be cylindrical, the container itself may exhibit a different shape. A cylindrical closure cap 31, which has a cylindrical element 32 provided with a female thread to match the male thread of neck 1, is screwed onto neck 1.

It is to be pointed out that the closure cap does not necessarily have to be one which is screwed onto the neck of the container. Other constructions are also conceivable as well such as, for example, a closure cap which is held to the container by means of projections on the container neck and either pressed or snapped onto the neck of the container or the container itself or affixed in some other way through friction, adhesion, etc.

The present closure cap 31 is provided with a central orifice 6 through which the medium 4 can flow.

The medium 4 is prevented from flowing by the self-closing valve, the entirety of which is indicated by reference numeral 5.

Valve 5 is disposed with a membrane 7 which curves somewhat spherically inwardly to the container interior 3 and to the medium 4 when the valve is in closed position, as depicted in FIG. 1.

Connecting wall 8, which is connected to support segment 10 by means of a curved section 9, adjoins membrane 7. Said support segment 10 is secured by two cylindrical bridges 11 formed on the substantially circular lid area 12 of closure 31 in the affixed state. The valve body consists of membrane, connecting wall and support segment and is formed as one integral piece. Lid 12 is configured such that the entire container can stand inverted thereupon, thus allowing it to be stored on its closure in an upside-down position.

This type of storage, respectively the corresponding technical design which allows for this type of storage, offers the advantage that the space above the membrane is always filled with fluid so that the processing of discharging does not depend upon the fluid first having to flow into the valve, even in the case of viscous media.

As will be described later, membrane 7 is not formed with a uniform wall thickness, but rather the wall thickness decreases towards its middle.

In this embodiment, connecting wall 8 itself is clearly thinner than the membrane.

The connecting wall consists of section a, which directly adjoins the membrane, and section b, which is connected to section a by means of curved section 9. In the closed position, there is an angle α of approximately 45° between sections a and b, as indicated in FIG. 1.

An annular protrusion 13 is formed integrally with the connecting wall in section b of the dividing wall and projects radially outwardly from same.

As can be seen in FIG. 3, when the valve is open, the annular protrusion positions on shoulder 14 of an annular protrusion 15 projecting inward from the closure cap lid, which is of substantially rotationally symmetric configuration.

Shoulder 14 is configured such that its inclination corresponds directly to the angle of annular protrusion 13 in the opened state.

Annular protrusion 15 widens outwardly in conical fashion away from container interior 3, thus forming a tracking for guiding dividing wall area a upon the opening of the valve.

Additionally, although not depicted in FIG. 1, a hinged lid, e.g. with a hemispherical cap, may be provided for holding the membrane in the position as shown in FIG. 1 and which serves as an added safeguard during transport.

Membrane 7 is slitted, as will now be further discussed with respect to FIGS. 2-4.

The valve and the membrane are formed to be rotationally symmetric as a whole, whereby the axis of rotation in FIG. 1 corresponds to the A-A line.

The membrane has, as can be seen in FIG. 2, a total of three slits which extend from the point at which the axis of rotation intersects said membrane, this point being indicated by reference numeral 18.

The three slits are likewise arranged symmetrically and constitute an angle of 120° to one another. The length of the slits in relation to the membrane ensues from the depiction in FIG. 1, according to which a slit takes up an approximate area of between ⅗ and ⅘ of the membrane radius. The slits themselves are cut with a knife tool, with the cut preferably being realized in the valve position as shown in FIG. 1. The slits then extend in a plane running perpendicular to cap lid 12 and including symmetrical axis A-A.

Each opening slit 16 has the same total length which in the representation according to FIG. 2 constitutes the x+y+z sectional lengths.

In the present embodiment, each slit is comprised of an inner segment II, which preferably amounts to more than half the slit's total length, and which is adjoined by a non-slitted material bridge 19. The slit then continues in segment I. Said first segment II exhibits a slit length of x, the material bridge that of y, and the following adjoining slit has the length of z. Material bridge 19, and thus the y length, is preferably somewhat shorter than the length of I.

This configuration to the slitting brings considerable advantages to the opening and closing of the slits.

As is known from the so-called membrane theory, complex multi-axial stress conditions arise within a stressed elastic membrane. The distribution of stress within the membrane especially impedes the closing of the membrane since because a portion of the stress generates force in a direction which is not parallel to the respective slit, the edges of the individual flaps 20 as the slits comprise have the tendency to ride up over one another.

The material bridge 19 and slit segment I which follows same results in a more defined condition of stress which clearly aids in the closing of the flaps.

This occurs on one hand due to the fact that the material bridge 19 is subjected to substantially just one uniaxial stress perpendicular to the respective slit. Upon opening of the individual flaps, material bridge 19 acts like a simple draw spring which cannot generate any displacing force on the slits respective one another, but instead works like a rubber band which expands upon opening of the flaps and has the tendency, due to the resilient force, to retract the flaps back again.

Slit segment I positioned following material bridge 19 magnifies this tendency since it wards off stress from material bridge 19 coming from a direction which is not perpendicular to the plane of the slits, thus substantially ensuring that only those forces which are perpendicular to the plane of the slits will have an effect within material bridge 19.

The functioning of this closure will be described in the following, especially with respect to FIGS. 3 and 4.

When a user wants to remove fluid from container 2, he opens a lid as may be provided (not shown in the figure), thereby exposing through orifice 6 in the closure cap.

The user then uses his hand to squeeze the flexible walls of container 2 together which causes excess pressure to build up in the container. This excess pressure causes segment b of connecting wall a to flip downward and annular protrusion 13 to position on shoulder 14. Since this process is one of dropping down and one which does not require any rolling motion on the part of the membrane, said process is a very simple and reliable one to realize.

The pressure eventually becomes so great that it surmounts the membrane's resilient strength and the flaps open outwardly resulting in opening O, as depicted in FIG. 4.

The material then starts to flow out of opening O, wherein the discharging process will continue for as long as the user generates excess pressure in the container due to his squeezing of it.

When the user ceases in applying pressure to the container walls, said container walls expand back out, the pressure drops, and the flaps close. Material bridge 19 hereby facilitates this closing motion substantially. These material bridges have a high elastic resilient strength when the flaps move over a plane which is perpendicular to the A-A rotationally symmetric axis and induce a powerful closing of the flaps, their cut surfaces being pressed against one another in the closed position and thus forming a secure closure. During the closing process, the low pressure prevailing in container 3 induces even the material still located in the opening area to be sucked back up into the container so that no residue of medium adheres to the outside of flaps 20 which could then drip down from same. The triangular configuration of three slits in particular contributes to the edges of flaps 20 pressing against one another in an automatically centering manner and preventing an opening from remaining in the area of axis of rotation 18 (FIG. 2).

The effect which the slits as employed has is primarily that of intensifying the resilient strength of the valve and this independent of the extent of the pressure since, as previously stated, the spans or material bridges 19 respectively, act like rubber bands in powerfully retracting the valve back to its original position. The result of this is that the valve is in all cases completely closed again at the end of each dispensing. Differing parameters as regards the length of sections I, II and the length of material bridges 19 as measured in this direction are of benefit to enable using the valve for different media. In this regard, the opening strength is, for example, even further reduced by bridge interruption. As a matter of fact, even very narrow material bridges will actually suffice. On the other hand, in accordance with another configuration, it is not required to break up the opening slits when a resilient force is to be attained without impairing the opening strength solely through a reducing of the x+y+z parameters alone. In one case, this version may appear such that the slits are interrupted with the z, y, x dimensions. The dimensions vary across the entire diameter of closure lid 7. According to another version, opening slit 16 is not interrupted but rather of differing length, meaning the z+y+x dimensions vary across the entire diameter of membrane 7.

As follows from the preceding, the configuration of the slits has substantial influence on the membrane's ability to open and close.

The utilization of three slits has the special advantage that the slits support each other in an automatically centering fashion. The utilization of material bridges or spans has the advantage that elastic resilient force can be generated in a uniaxial condition of stress.

The length of the slits and the width of the material bridges as well as the number of material bridges (there can also be two or more material bridges per slit) can vary in order to adapt the opening and closing dynamics to different media.

In a configuration having three, four, five or more slits, all the slits can be realized to have the same length. This is preferred in a rotationally symmetric design of the valve member and a rotationally symmetric arrangement of the center of a star-shaped slitting having three, four, five or more slits.

In the case of a star-shaped slitting having three, four, five or more slits, however, the individual slits may also be configured to have different lengths so that the slitting itself is not rotationally symmetric. It is further possible, also in the case of a membrane configured to be rotationally symmetric, to arrange the slits such that the common point of all the slits on the membrane does not coincide with the axis of rotation of same. It is even further possible to provide a configuration having three, four, five or more slits in a star-shaped design having the same or differing slit lengths in which the angle between the individual slits is not the same. In the case of four slits, the slits could be configured to have, for example, an angle of >90° to one adjacent slit and an angle of <90° to its other adjacent slit.

Finally, it is also possible to provide a plurality of slits in the membrane which are not connected to one another so that more than one opening O will result upon pressure being exerted on the membrane.

Due to the inwardly curved form of the membrane in the closed position, the cut edges of flaps 20 brace against each other in a curved fashion, resulting in a high retaining strength. Yet at the same time, due to the low pressure, even just a weak force will suffice to open the flaps inwardly, encouraging the medium to be sucked back up into the container.

The slitting with material bridges has been previously described in relation to a membrane having three slits. It is to be pointed out, however, that a corresponding slitting with material bridges may also be realized in the case of just one slit being provided, which then extends over the axis of rotation, as well as when four or five slits are provided. In such cases, slit length and material bridges are likewise to be correspondingly matched to one another.

FIGS. 5, 6 and 7 show a first embodiment of the inventive closing valve. Said closing valve can be inserted into a closure cap in a similar manner as in the case of the closing valve in accordance with FIGS. 1-4. However, this closing valve exhibits certain deviations from the closing valve according to FIGS. 1-4 which the following will now clarify in greater detail.

It must first be pointed out that the configuration of the membrane and especially the various embodiments of the slits are the same as in the valve according to FIGS. 1-4. Therefore, the following will not go into the slitting arrangement again in detail.

The valve indicated as a whole by reference numeral 50 comprises a retaining ring 51, a connecting wall 52, and a membrane designated as a whole by reference numeral 53.

Retaining ring 51 is configured in annular shape and has a conical canting 51a to its outer circumference.

Retaining ring 51 merges integrally with connecting wall 52.

Retaining ring, connecting wall and membrane are configured to be rotationally symmetric, whereby the axis of rotation is indicated by reference numeral 55.

Retaining ring 51 is positioned in a plane which is perpendicular to axis of rotation 55.

Connecting wall 52 consists of an annular front part 52a, which extends substantially in the same plane as retaining ring 51; i.e., also perpendicular to the valve's axis of rotation 55. An area 52b provided at the front part of connecting wall 52 extends upwardly in curved fashion at a obtuse angle (in the depiction according to FIG. 5); i.e. away from the container interior when the valve is affixed to the container.

This upwardly curved area 52b of connecting wall 52 merges with hinge member 56, which merges through a connecting area 57 into membrane 53.

Hinge member 56 exhibits, as seen from the container side, a marked notch 58 which, when seen in cross-section, is of trapezoidal shape.

The undermost wall of recess 58a (which is the upper edge in the depiction according to FIG. 5) is relatively narrow in relation to the depth of the notch, advantageously amounting to half, particularly advantageously to a third up to a fifth of the recess depth.

The design of the membrane depicted in FIG. 5 is advantageous for the functioning of the closure. Connecting area 57 has a side wall adjacent notch 58 extending substantially straight, whereby its intended elongation constitutes an acute angle of preferably 60-85° to axis 55. A short bowed section abuts this side wall, which in its main elongation constitutes an obtuse angle of 140-170° to axis 55. The upper part of connecting area 57 facing away from recess 58 exhibits a substantially S-shaped form.

As can be readily seen from FIG. 5, connecting area 57 is not arranged symmetrically on the membrane's side wall 60 but is rather offset upwardly in FIG. 5; i.e. away from the container interior.

Outer situated surface 61 of the membrane is furthermore curved outwardly substantially throughout, whereby said curvature preferably approximates a function of second degree.

The opposite wall 62 facing the container interior consists of a disc-shaped plate 62a, a linear contact surface 62b extending at an acute angle to axis 55 in cross-section representation, to which the previously discussed side wall 60 adjoins. The acute angle is preferably within the range of between 40 and 80°, especially preferred within the range of between 50 and 60°.

Due to the cross-sectional design of the membrane walls as described, the membrane thickness continues to increase in thickness from its center, which is dissected by axis of rotation 55, through to the side wall.

In so doing, the membrane thickness in the area where disc-shaped side wall 62a, which forms a plane perpendicular to axis of rotation 55, merges with conical area 62b, which in cross-section forms an acute angle with axis of rotation 55, is approximately twice as large as the membrane thickness in the area of the axis of rotation. The membrane's outer side wall 60 has a thickness which, measured parallel to axis of rotation 55, corresponds to roughly triple or quadruple the thickness of the membrane's middle.

The membrane is preferably made from a silicone material, however other synthetic materials such as thermoplastic elastomers and the like may also be considered.

Tests have shown that a membrane produced in the above-described manner from a silicone material having slitting as described with respect to FIGS. 2 and 4 exhibits especially good properties as regards opening and closing. A membrane configured in such a manner is easy to open and with a relatively large opening diameter, the open state can be maintained open with just a slight application of pressure and closes reliably and tightly as soon as the excess pressure drops, whereby residues of the medium still present in the area of the opening will be sucked back into the container upon closing.

Another distinctive feature of the configuration according to FIG. 6 is the additional retaining ring 70. Said retaining ring comprises, as can readily be seen from FIG. 6, a plurality of peripherally arranged openings 71 which, in cross-section, as is especially apparent from FIG. 5, widen downward; i.e., away from the contact area with support segment 51a of the valve as depicted in FIG. 5.

Retaining ring 70 is made from a harder, less elastic synthetic material than the material of the actual membrane.

The valve in accordance with FIGS. 5 and 6 is produced as follows:

Retaining ring 70 is first molded from the suitable synthetic material in a separate step.

The retaining ring is then inserted into the valve body mold and, as in the embodiment, silicone material is injected into the mold. In doing so, the silicone material penetrates into cut-outs 71.

The silicone material is then heat-treated at suitable temperatures for a longer period of time.

After the valve body is finished, the valve is slotted in the manner as shown in FIG. 2.

The valve is subsequently inserted into a closure cap similar to the representation of FIG. 1 which has been configured so as to correspondingly receive retaining ring 70.

FIG. 8 shows a further embodiment of an inventive closing valve which can be inserted into a closure cap in a similar manner as the closure valve in accordance with FIGS. 1-4. The functionality and design of the membrane as well as especially the slitting of said membrane is equivalent to that as has already been discussed especially with respect to the description of FIGS. 1-4.

The valve according to FIG. 8 does, however, exhibit some distinctive features which the following will focus on in particular.

The valve extending in a substantially rotationally symmetric manner to axis 80 is disposed with a membrane 82 integrally joined with connecting wall 84, which is arranged to be substantially radially inward the first retaining ring 86, which is integrally joined with connecting wall 84 as well as membrane 82. Said first retaining ring 86 contacts a second retaining ring 88, which is arranged on the side of first retaining ring 86 facing the container in the valve's affixed state.

The membrane is of hollow semi-spherical shape or its configuration approximates such a form. Connective lines extending from the radially outer points of membrane 82 to the center of the curvature preferably extend to a cone which has an angle of spread in the range between 45 and 135°; it is especially preferred for same to amount to approximately 90°. As shown in FIG. 8, membrane 82 has a constant wall thickness. Protrusion 92 projects away from the container into the transition zone 90 between membrane 82 and the connecting wall and is of particularly tapered configuration.

As the side or direction facing away from the container, the following will denote the side or direction which faces the outside of the container based on the direction of axis 80 when the valve is arranged to a container. To correspondingly simplify the direction or side facing the container interior in arranged state, same will be designated as the direction facing the container interior or side or the inward facing side based on the direction of axis 80.

Annular protrusion 92 is particularly restricted toward axis 80 by a section having a spherical surface component and/or which adjoins a spherical surface and in fact in such a way that said spherical end area section opposite said section is at least slightly inclined outwardly so that the section constitutes an angle to axis 80 which is more obtuse than the angle the tangents in the end section of the spherical surface constitute to said axis 80. On the side facing away from axis 80, protrusion 92 is restricted by a surface which drops off substantially steeply and constitutes an angle to axis 80 which is preferably less than 45°; less than 10° is especially preferred. The outer valve surface following said protrusion 92 extends in radial outward direction in substantially curved manner, particularly in a wave-like or S-shaped curve. A notch 94 having a rounded base area facing the container adjoins protrusion 92 and to which annular protrusion 96 rounded toward the container exterior in turn adjoins in radial outward direction. A disc-like area 98 adjoins said protrusion 96 in the radially outward direction, whereby the transition from said protrusion 96 to said disc-like area 98 is configured to be substantially curved. Disc-shaped area 98 extends substantially perpendicular to axis 80. A second disc-shaped area adjoins said disc-shaped area radially outwardly to form the first retaining ring 86, whereby the disc-shaped area's boundary surface facing the container interior lies in substantially the same plane and whereby the disc-shaped area's boundary surface facing the container exterior lies in substantially different planes and particularly in such a manner that first retaining ring 86 is configured to be thicker than disc-shaped area 98 of connecting wall 84.

The boundary surface of the first retaining ring 86 facing the container interior as well as the boundary surface of the disc-shaped area of connecting wall 84 likewise facing the container interior extend substantially perpendicular to axis 80. Radially inwardly facing the container, an annular notch 100 adjoins the lower boundary surface of said annular area 98 of connecting wall 84, its base area 102 configured to be substantially rounded. The boundary surface 104 extending in the direction of axis 80 from said base area 102 of said notch 100 is configured to be curved and is in particular a part of the boundary surface of membrane 80 facing the container interior.

The boundary wall 106 arranged on the opposite side of base area 102 of notch 100 as seen from axis 80, which extends from disc-shaped area 98 to base area 102 of notch 100, is likewise of curved configuration and to be precise, in particular at least approximating a semi-spherical shape, the center of its curve being positioned to face away from the container.

Connecting wall 84 is particularly configured to be thinner than membrane 82.

Disc-shaped configured second retaining ring 88 facing the container adjoins first retaining ring 86 and preferably exhibits a larger outer diameter than first retaining ring 86.

The valve is preferably configured to be flat so that the outer diameter of the valve is at least double, preferably at least triple, especially preferable at least five times, particularly preferable at least seven times as large as the maximal valve thickness in the direction of axis 80, as shown schematically by double arrow 108.

Protrusion 96 is preferably radially offset relative base area 102 of notch 100.

It is especially preferred that base area 102 of notch 100 is arranged radially between protrusion 96 and constriction 94.

The second retaining ring is preferably made from polypropylene or polyamide. The remaining part of the valve, respectively membrane 80, connecting wall 82, as well as the first retaining ring 86 and their contact surfaces are preferably made from silicone or a thermoplastic elastomer.

The material combination of silicone and polyamide or the material combination of a thermoplastic elastomer and polypropylene are hereby particularly preferred. These materials or material combinations are also preferred for other embodiments of the invention.

The invention claimed is:

1. A self-closing valve for the dispensing of flowable media from a container having;
    a curved membrane, the curvature of which is directed toward the flowable media in the closed position and which curves outwardly into a dispensing position upon pressure being generated in the container,
    a connecting wall arranged between said membrane and a first retaining ring,
    a slitting provided in said membrane which opens in the dispensing position, wherein said slitting is arranged such that upon the deformation of the membrane from the closed position to the dispensing position induced by the application of pressure to the container, elastic resilient forces are generated within the membrane which cause said membrane to retract from said dispensing position to said closed position upon depressurization,
    said connecting wall between said first retaining ring and said membrane is disposed with a disc-like area which is arranged substantially in a common plane with said first retaining ring or on a plane which is parallel to same,
    wherein a transition zone between the connecting wall and the membrane is configured such that substantially no or only minimal torque is transferred from said connecting wall to said membrane so that any torque transmitted from said connecting wall to said membrane has substantially no effect on the opening and closing of said slitting; and
    a constriction/notch is provided in said transition zone between the connecting wall and the membrane on a side facing away from the container;
    wherein said connecting wall has an area extending upwardly in curved fashion from the first retaining ring away from the container interior when the valve is affixed to the container;
    the upwardly curved area merges with an annular protrusion into the membrane so that the transition zone between the connecting wall and the membrane is configured in a hinge-like manner.

2. A self-closing valve in accordance with claim 1 wherein said membrane and said connecting wall are configured to be substantially rotationally symmetric.

3. A self-closing valve in accordance with claim 2 wherein said slitting is configured to be rotationally symmetric to said axis of rotation.

4. A self-closing valve in accordance with claim 1 wherein said membrane has a peripheral wall directed substantially to the connecting wall and a contact area is formed on said wall for connecting the membrane with the connecting wall.

5. A self-closing valve in accordance with claim 4, wherein said contact area is formed on a middle region of said peripheral wall such that it is disclosed toward the inner curvature and, when in assembled state, away from the container interior.

6. A self-closing valve in accordance with claim 1 wherein said slitting is configured such that it has one slit.

7. A self-closing valve in accordance with claim 6 wherein at least one of said slits is interrupted so as to create a material bridge, whereby the length of said slit interruption is smaller than the total length of the respective slit.

8. A self-closing valve in accordance with claim 6 wherein at least one slit has at least two or more interruptions.

9. A self-closing valve in accordance with claim 1 wherein said slitting comprises four, five or more slits which are preferably arranged so as to be star-shaped and which preferably have the same angular spacing from one another.

10. A self-closing valve in accordance with claim 1 wherein a reinforcing ring is provided which is made from a harder synthetic material than the material of the membrane.

11. A self-closing valve in accordance with claim 10 wherein said reinforcing ring is configured to be rotationally symmetric around the valve and having a plurality of openings.

12. A self-closing valve in accordance with claim 1 wherein said valve body is made from a silicone material.

13. A self-closing valve in accordance with claim 1 wherein said valve body is made from a thermoplastic elastomer.

14. A self-closing valve in accordance with claim 1 wherein said valve is made from thermoplastic elastomer and polypropylene or from silicone and polyamide.

15. A self-closing valve in accordance with claim 1 wherein said membrane is configured in segmented semispherical form and has a substantially constant thickness.

16. A self-closing valve for the dispensing of flowable media from a container having;
   a curved membrane, the curvature of which is directed toward the flowable media in the closed position and which curves outwardly into a dispensing position upon pressure being generated in the container,
   a connecting wall arranged between said membrane and a first retaining ring,
   a slitting provided in said membrane which opens in the dispensing position, wherein said slitting is arranged such that upon the deformation of the membrane from the closed position to the dispensing position induced by the application of pressure to the container, elastic resilient forces are generated within the membrane which cause said membrane to retract from said dispensing position to said closed position upon depressurization,
   said connecting wall between said first retaining ring and said membrane is disposed with a disc-like area which is arranged substantially in a common plane with said first retaining ring or on a plane which is parallel to same,
   wherein a transition zone between the connecting wall and the membrane is configured such that substantially no or only minimal torque is transferred from said connecting wall to said membrane so that any torque transmitted from said connecting wall to said membrane has substantially no effect on the opening and closing of said slitting; and
   said area of the connecting wall extending upwardly in curved fashion is at least approximately a semi spherical shape, the center of its curve being positioned to face away from the container;
   wherein said connecting wall has an area extending upwardly in curved fashion from the first retaining ring away from the container interior when the valve is affixed to the container;
   the upwardly curved area merges with an annular protrusion into the membrane so that the transition zone between the connecting wall and the membrane is configured in a hinge-like manner.

17. A self-closing valve for the dispensing of flowable media from a container having;
   a curved membrane, the curvature of which is directed toward the flowable media in the closed position and which curves outwardly into a dispensing position upon pressure being generated in the container,
   a connecting wall arranged between said membrane and a first retaining ring,
   a slitting provided in said membrane which opens in the dispensing position, wherein said slitting is arranged such that upon the deformation of the membrane from the closed position to the dispensing position induced by the application of pressure to the container, elastic resilient forces are generated within the membrane which cause said membrane to retract from said dispensing position to said closed position upon depressurization,
   said connecting wall between said first retaining ring and said membrane is disposed with a disc-like area which is arranged substantially in a common plane with said first retaining ring or on a plane which is parallel to same,
   wherein a transition zone between the connecting wall and the membrane is configured such that substantially no or only minimal torque is transferred from said connecting wall to said membrane so that any torque transmitted from said connecting wall to said membrane has substantially no effect on the opening and closing of said slitting; and
   said area of the connecting wall extending upwardly in curved fashion is at least approximately a semi spherical shape, the center of its curve being positioned to face away from the container;
   a constriction/notch is provided in said transition zone between the connecting wall and the membrane on a side facing away from the container;
   wherein said connecting wall has an area extending upwardly in curved fashion from the first retaining ring away from the container interior when the valve is affixed to the container;
   the upwardly curved area merges with an annular protrusion into the membrane so that the transition zone between the connecting wall and the membrane is configured in a hinge-like manner.

\* \* \* \* \*